June 11, 1929.  F. H. WINTER  1,717,293
ELECTRICAL REGULATOR
Filed Oct. 31, 1927

Inventor:
Fred H. Winter
by *Alexander S. Lunt*
His Attorney

Patented June 11, 1929.

1,717,293

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

ELECTRICAL REGULATOR.

Application filed October 31, 1927. Serial No. 229,874.

My invention relates to electrical regulators and more particularly to regulators and regulating systems employing a vibratory contact device to vary the excitation of a dynamo-electric machine for controlling an electrical characteristic thereof.

In well-known types of vibratory regulators having a vibrator coil or anti-hunting coil energized in accordance with an electrical characteristic of the excitation circuit of the machine which is to be regulated the energization varies throughout a wide range. As the load on the dynamo-electric machine increases the increased energization of the anti-hunting coil modifies the action of the main regulator coil so that the excitation of the dynamo-electric machine is not varied in the proper manner to maintain, for example, a uniform or increasing voltage with increasing load. That is, the usual arrangement of anti-hunting means energized directly from the excitation circuit tends to effect under-compounding of the dynamo-electric machine.

An object of my invention is to provide an improved regulator and system of regulation in which anti-hunting means energized in accordance with an electrical characteristic of the excitation circuit of the dynamo-electric machine being controlled, will not cause an undesirable modification of the action of the regulator, such as under-compounding, throughout the range of variation of the excitation characteristic.

My invention will be better understood from the following description taken in connection with the accompanying drawing and its scope will be pointed out in the appended claims.

Figure 1:
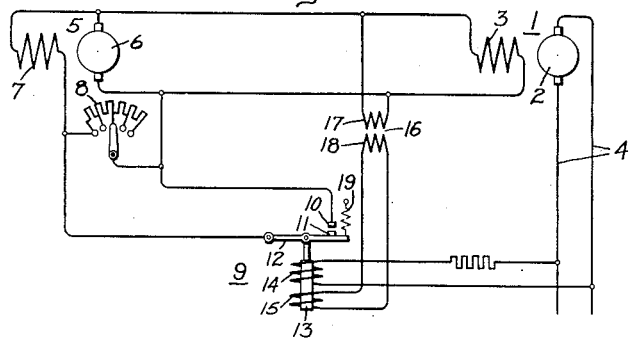
Figure 2:
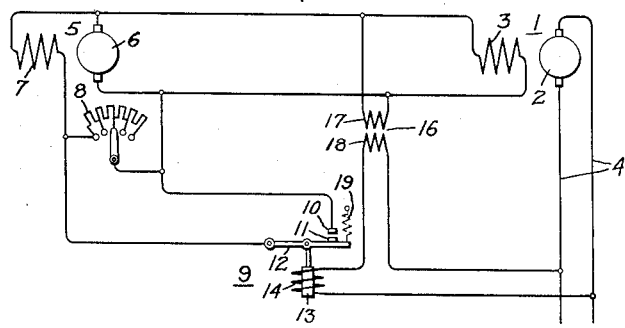
Figure 3:
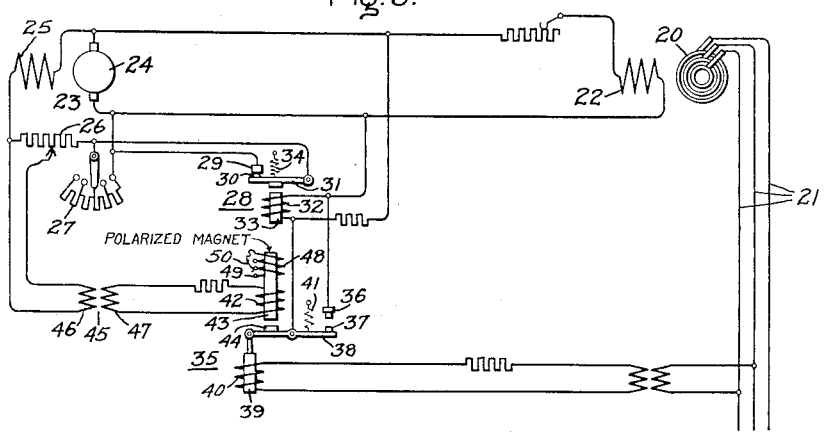

In the accompanying drawing, Fig. 1 is a diagrammatic illustration of one embodiment of my invention applied to the regulation of a direct current generator, Fig. 2 is a modification of the arrangement shown in Fig. 1, and Fig. 3 is a diagrammatic illustration of a modification of my invention embodied in a system of regulation for alternating current generators.

Referring to Figs. 1 and 2 of the drawing, wherein are shown regulating systems for direct current generators and wherein similar parts are designated by similar reference characters, 1 denote a direct current generator having an armature 2 and a field winding 3. The armature 2 is connected to a supply circuit comprising conductors 4. The field winding 3 may be excited from its armature 2 but as shown an exciter 5 comprising an armature 6 and a field winding 7 is provided to furnish the excitation. The field winding 7 of the exciter is connected in series with a regulating resistor 8 across the armature 6. A regulator 9 comprising cooperating contacts 10 and 11 is provided for controlling the generator voltage by rapidly opening and closing a shunt circuit across the resistor 8. For simplicity of illustration, these contacts are shown as operating directly across the resistor 8 but the well-known intermediate relay which is controlled by these primary contacts as shown in Fig. 3 can be used in practice if preferred. Contact 10 is fixed in position and contact 11 cooperating therewith is supported on a vibratory member 12 which is actuated by a core 13 connected to said member. The core 13 changes the relative position of the contacts under the influence of a main control coil 14 which is connected to be energized from the conductors 4 leading from the generator. In Fig. 1 a second coil 15 is provided to cause a continuous vibratory movement between the contacts and is inductively connected to the excitation circuit by means of an inductive device 16. The inductive device preferably comprise a transformer having a primary winding 17 which is connected to be responsive to the voltage across the field winding 3 of the generator 1 and a secondary winding 18 which is connected to energize the coil 15. The pull of the main coil 14 is opposed by a spring 19 which tends to maintain the contacts closed. According to the modification shown in Fig. 2 it is possible to eliminate the coil 15 by merely connecting the secondary winding 18 of transformer 16 in series relation with the coil 14 so that the voltage impulses from the transformer will modify the energization of the main coil 14 in a manner to effect the proper vibratory action of the contacts without under-compounding.

The operation of the arrangement shown in Fig. 1 is as follows: If the voltage of the generator 1, or conductors 4, is assumed to be below the predetermined normal value which it is desired to maintain constant the spring 19 closes the contacts 10 and 11. Upon closure of these contacts the field excitation of the exciter 5 increases at a rapid rate and the voltage applied to the field winding 3 also rises at a rapid rate. Upon the occurrence of a voltage rise across field winding 3 a voltage is induced in the secondary winding 18 of transformer 16 which is arranged to energize the winding 15 by a voltage impulse to cause a current flow acting accumulatively with the current in coil 14. This action opens the contacts at a time previous to that obtained with the coil 14 alone so that the oscillations of the voltage wave are reduced in amplitude. In other words, coil 15 eliminates hunting, but it is to be noted that the energization of coil 15 is not influenced by the magnitude of the voltage across the field winding 3 but functions in accordance with the rate of change of the electrical characteristic of the exciter circuit to which it is made responsive. In a similar manner if the voltage of the generator 1 or of conductors 4 rises above the predetermined value which is to be maintained constant, coil 14 opens the contacts. This results in inserting the resistance in the field circuit of the exciter 5 and causes a decrease in the voltage applied to field winding 3. Upon a decrease in this applied voltage a voltage impulse is applied to winding 15 through transformer 16 resulting in a current flow and consequent magnetization acting differentially with the magnetization from coil 14 and permits the spring 19 to close contacts 10 and 11 at a time previous to that obtained with coil 14 alone. As a result the amplitude of the voltage oscillation is decreased and hunting is obviated without the usual difficulties of having the anti-hunting coil act in a different manner throughout the range of exciter voltage.

The operation of the modification illustrated in Fig. 2 is substantially the same as that of the modification illustrated in Fig. 1 which has already been described. Upon a rapid increase in the voltage applied to field winding 3 due to engagement of contacts 10 and 11 a voltage impulse is added in series with the voltage from the conductors 4 to the coil 14 causing the contacts to open at an earlier period than when under the influence of coil 14 alone. In a similar manner upon a rapid decrease in the voltage applied to field winding 3 due to a separation of the contacts a voltage impulse acts in opposition to the voltage applied to coil 14 from the conductors 4 and permits the contacts 10 and 11 to be closed before the amplitude of the oscillation of the regulated voltage attains an appreciable value.

Referring to Fig. 3, wherein is shown a regulating system which is particularly adapted for use with an alternating current dynamo-electric machine, 20 denotes an alternating current generator which is connected to a distribution circuit comprising conductors 21. The generator is provided with a field winding 22 which is connected to be energized from an exciter 23 comprising an armature 24 and a field winding 25. A fixed resistor 26 and an adjustable regulating resistor 27 are connected in series with field winding 25 across the armature 24 of the exciter 23. A relay 28 comprising cooperating contacts 29 and 30 is provided for closing and opening a circuit in shunt to the regulating resistor 27. The contact 29 is fixed in position and contact 30 cooperating therewith is supported on a lever 31 which is actuated by electroresponsive means comprising a solenoid 32 and a core 33. The solenoid 32 may be energized from any convenient source of electrical energy and as shown is connected to be energized from the voltage of the exciter. A spring 34 is provided to close the contacts when solenoid 32 is deenergized.

A regulator 35 comprising cooperating contacts 36 and 37 is provided for controlling the operation of the relay 28. Contact 36 is fixed in position and contact 37 cooperating therewith is supported on a vibratory member 38 which is actuated by a core 39 connected to said member. The core 39 changes the relative position of the contacts under the influence of a main control coil 40 which is connected to be energized in accordance with an electrical characteristic of the generator 20 which is to be regulated, and as shown this coil is connected across one phase of the conductors 21 to be responsive to the voltage of the generator. The pull of the core 40 is opposed by a spring 41 which tends to maintain the contacts 36 and 37 closed. The regulator is provided with an anti-hunting arrangement which is similar to the arrangement shown in Figs. 1 and 2 but in this case the anti-hunting coil 42 is positioned on a separate polarized magnetic core, such for example, as a permanent magnet 43 which is arranged to cooperate with an armature 44 mounted on the contact member 38. It will also be apparent to those skilled in the art that the magnetic core 43 may be polarized from any convenient source of steady unidirectional current such as a battery and may be used in place of a permanent magnet, if preferred, without departing from my invention in its broader aspects. The anti-hunting coil in this instance is placed upon a polarized core which is magnetically independent of the core of the alternating current main control magnet because it is not feasible to increase or decrease the pull on the contact lever at the proper time when attempting to combine the impulse voltage of the anti-hunting coil and the rapidly alternating flux in the main control core. The anti-hunting coil is connected to be energized in accordance with an electrical characteristic of the excitation circuit through the intermediary of a transformer 45 which comprises a primary winding 46 and a secondary winding 47. It will readily occur to those skilled in the art that the primary winding 46 may be connected across a resistance in the exciter field circuit, the field coil of the exciter, or the field coil 22 of generator 20 and may be so connected, if preferred, without departing from my invention in its broader aspects, but for purposes of illustration and in contradistinction to the arrangements shown in Figs. 1 and 2 I have shown it connected across the resistor 26 so that the impulse energization of the anti-hunting coil 42 is obtained in accordance with the rate of change of current in the exciter field.

In order to furnish a means for adjusting the effect of the anti-hunting coil when used in connection with excitation systems having different speeds of response it is desirable to provide a means whereby the time of response of the anti-hunting magnet may be increased or decreased. For example, if the anti-hunting coil is used in connection with an excitation system which is designed and arranged to have a very high speed of response the action of the anti-hunting coil may be too rapid and may cause the contacts to be opened in too short an interval of time after the field current starts to change. A method of changing the time of response of the anti-hunting coil consists in using a coil 48 of high electrical conductivity around the core 43 and providing this coil with taps 49 which can be engaged by a short-circuiting member 50 so that the core can be surrounded by any desired number of short-circuited turns to retard the change in flux through the core. It will of course be apparent to those skilled in the art that this means of adjusting the time of response of the anti-hunting means herein described in connection with Fig. 3 may also be applied equally well to the arrangement shown in Figs. 1 and 2 and may be used if desired without departing from my invention in its broader aspects.

The operation of the modification illustrated in Fig. 3 is believed not to require a detailed description other than to point out wherein it differs from the modifications shown in Figs. 1 and 2. In this arrangement if the voltage of generator 20 rises above the predetermined value which is to be maintained, contacts 36 and 37 separate, whereupon coil 32 of the relay 28 is energized and its contacts 29 and 30 open to insert the resistance 27 in the field circuit of exciter 24. Upon the insertion of the resistance 27 the field current rapidly decreases and the voltage impulse through the transformer winding 46 is arranged to induce in winding 47 a voltage which is in a direction to cause the flux of coil 42 to decrease the pull of the magnet core 43 and permit the contacts 36 and 37 to close in a shorter interval of time than would be occasioned by the coil 40 which is responsive to the alternator voltage. If the voltage of generator 20 decreases below the predetermined value which is to be maintained, contacts 36 and 37 close, whereupon coil 32 of relay 28 is short-circuited and the spring 34 closes contacts 29 and 30 to short circuit the resistance 27. Upon short-circuiting resistance 27 the field current rapidly increases and the voltage impulse through the transformer winding 46 is arranged to induce in the secondary winding 47 a voltage which is in a direction to cause the flux of coil 42 to increase the pull of magnet core 43 and permit the contacts to open in a shorter interval of time than would be occasioned by the coil 40 which is responsive to the alternator voltage.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:—

1. In combination, a dynamo-electric machine having an excitation circuit, a regulator for controlling an electrical characteristic of said dynamo-electric machine, anti-hunting means for said regulator inductively connected to said excitation circuit, and means for changing the time of response of said anti-hunting means.

2. The combination with a dynamo-electric machine having an excitation circuit, of a regulator therefor comprising cooperating contacts for varying the current in said excitation circuit, a contact member for supporting one of said contacts, a winding operatively associated with said contact element for opening and closing said cooperating contacts in accordance with variations from a predetermined value of the voltage of said dynamo-electric machine, a polarized magnet operatively associated with said contact member for modifying the operation thereof, means comprising a coil inductively related to said excitation circuit for modifying the action of said polarized magnet upon the occurrence of a change in an electrical characteristic of said excitation circuit, and means for changing the time of response of said last-mentioned coil.

3. In combination, a dynamo-electric machine, an exciter therefor, a pair of cooperating contacts arranged to control by their engagement and disengagement the voltage of said exciter, a contact lever for supporting one of said contacts, a magnet responsive to the voltage of said dynamo-electric machine for actuating said contact lever, a permanent magnet operatively associated with said contact lever and arranged to exert a continuous pull thereon, a coil surrounding said permanent magnet, means responsive to the rate of change of current in said excitation circuit for modifying the pull of said permanent magnet, and means for changing the time of response of said last-mentioned coil.

4. In combination, an alternating current generator, a field winding therefor, an exciter for energizing said field winding, a pair of cooperating contacts arranged to control by their engagement and disengagement the voltage of said exciter, a contact lever for supporting one of said contacts, a winding connected to be energized in accordance with the voltage of said generator for actuating said lever, a permanent magnet arranged to exert a continuous pull on said lever, a coil surrounding said permanent magnet, a transformer connected to be responsive to a change of current in the excitation circuit of said generator for energizing said coil to effect a change in the pull of said permanent magnet, and means comprising an adjustable-turn short-circuited winding positioned on said permanent magnet for changing the time of response of said first-mentioned coil.

In witness whereof, I have hereunto set my hand this 29th day of October, 1927.

FRED H. WINTER.